United States Patent
Ortiz et al.

(10) Patent No.: US 10,313,435 B2
(45) Date of Patent: *Jun. 4, 2019

(54) SYSTEMS AND METHODS FOR ENABLING TEMPORARY, USER-AUTHORIZED CLONING OF MOBILE PHONE FUNCTIONALITY ON A SECURE SERVER ACCESSIBLE VIA A REMOTE CLIENT

(71) Applicants: Sharon G. Ortiz, Albuquerque, NM (US); Luis M. Ortiz, Albuquerque, NM (US)

(72) Inventors: Sharon G. Ortiz, Albuquerque, NM (US); Luis M. Ortiz, Albuquerque, NM (US)

(73) Assignee: ORTIZ TECHNOLOGY GROUP, LLC, Albuquerque, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,208

(22) Filed: Aug. 7, 2017

(65) Prior Publication Data

US 2018/0048706 A1   Feb. 15, 2018

Related U.S. Application Data

(63) Continuation of application No. 13/404,636, filed on Feb. 24, 2012, now Pat. No. 9,729,628.

(60) Provisional application No. 61/450,930, filed on Mar. 9, 2011.

(51) Int. Cl.
*H04L 29/06* (2006.01)
*H04L 29/08* (2006.01)
*H04W 12/06* (2009.01)
*H04W 12/08* (2009.01)

(52) U.S. Cl.
CPC ...... *H04L 67/1095* (2013.01); *H04L 63/0272* (2013.01); *H04L 67/125* (2013.01); *H04W 12/06* (2013.01); *H04W 12/08* (2013.01)

(58) Field of Classification Search
None
See application file for complete search history.

(56) References Cited

U.S. PATENT DOCUMENTS

| | | | |
|---|---|---|---|
| 5,091,942 | A | 2/1992 | Dent |
| 5,754,119 | A | 5/1998 | Deluca et al. |
| 6,141,341 | A | 10/2000 | Jones et al. |

(Continued)

*Primary Examiner* — Christopher A Revak
(74) *Attorney, Agent, or Firm* — Ortiz & Lopez, PLLC

(57) ABSTRACT

Temporary, user-authorized cloning of physical mobile phone functionality via a secure server can enable physical mobile phone features to be accessed and controlled by a user from a remote client. A secure server can include mobile phone registration information, enable secure access by users via a remote client, maintain communication and synchronization with the mobile phone, receive data associated with the physical mobile phone when is not in communication with at least one of a supporting telecommunication network and the secure server, and enable the physical mobile phone user to obtain secure communication with the secure server via a remote client, access and manage cloned mobile phone data and communicate with third parties. Physical mobile phone user access to the secure server and cloned mobile phone functionality with the remote client can be terminated once the physical mobile phone user logs off of the secure server from the remote client.

17 Claims, 3 Drawing Sheets

(56) References Cited

U.S. PATENT DOCUMENTS

| | | |
|---|---|---|
| 7,280,535 B1 | 10/2007 | Bergman et al. |
| 7,558,862 B1 | 7/2009 | Tyukász et al. |
| 7,630,721 B2 | 12/2009 | Ortiz |
| 7,751,347 B2 | 7/2010 | Giroti |
| 7,920,899 B2 | 4/2011 | Jain |
| 8,060,564 B2 | 11/2011 | Mousseau et al. |
| 8,265,083 B1 | 9/2012 | Cannon et al. |
| 9,729,628 B2 * | 8/2017 | Ortiz .................. H04L 63/0272 |
| 2005/0239440 A1 | 10/2005 | Chen et al. |
| 2005/0282584 A1 | 12/2005 | Faisy |
| 2006/0223553 A1 | 10/2006 | Reisgies |
| 2006/0285663 A1 | 12/2006 | Rathus et al. |
| 2007/0049245 A1 | 3/2007 | Lipman |
| 2007/0100906 A1 | 5/2007 | Cheng et al. |
| 2007/0282925 A1 | 12/2007 | Son |
| 2008/0137642 A1 | 6/2008 | Teodosiu et al. |
| 2008/0223937 A1 | 9/2008 | Preta et al. |
| 2009/0019492 A1 | 1/2009 | Grasset |
| 2009/0265552 A1 | 10/2009 | Moshir et al. |
| 2010/0318615 A1 | 12/2010 | Griffin |
| 2011/0064073 A1 | 3/2011 | Lu et al. |
| 2011/0141276 A1 | 6/2011 | Borghei |
| 2011/0215921 A1 | 9/2011 | Ben Ayed et al. |
| 2011/0293095 A1 | 12/2011 | Ben Ayed |
| 2011/0313922 A1 | 12/2011 | Ben Ayed |
| 2012/0019361 A1 | 1/2012 | Ben Ayed |
| 2012/0019379 A1 | 1/2012 | Ben Ayed |
| 2014/0279477 A1 | 9/2014 | Sheets et al. |
| 2016/0057184 A1 | 2/2016 | O'Brien |

\* cited by examiner

SYSTEMS AND METHODS FOR ENABLING TEMPORARY, USER-AUTHORIZED CLONING OF MOBILE PHONE FUNCTIONALITY ON A SECURE SERVER ACCESSIBLE VIA A REMOTE CLIENT

INVENTION PRIORITY

The present invention claims priority as a continuation application of U.S. patent application Ser. No. 13/404,636, which was filed on Feb. 24, 2012, entitled "SYSTEMS AND METHODS FOR ENABLING TEMPORARY, USER-AUTHORIZED CLONING OF MOBILE PHONE FUNCTIONALITY ON A SECURE SERVER ACCESSIBLE VIA A REMOTE CLIENT," which claims the benefit of U.S. Provisional Patent Application No. 61/450,930, filed on Mar. 9, 2011, entitled "Systems and methods for enabling temporary, user-authorized cloning of mobile phone functionality on a secure server accessible via a remote client," the specifications of which are hereby incorporated by reference for their teaching.

TECHNICAL FIELD

The present invention is generally related to the field of mobile telecommunications devices and networks. The present invention is more particularly related to the field of enabling user-authorized mobile telecommunications device cloning using a secure server and access to cloned mobile phone functionality via a remote client.

BACKGROUND

Phone cloning is more than mere archiving of data stored in a mobile phone on a remote server for retrieval from an alternate client, which is typical of services that are currently available for Android-based mobile phones having access to the currently popular Gmail™ mail system sponsored by Google™. Phone cloning also involves placing a computer chip into the target mobile telephone, allowing the electronic serial number (ESN) of the mobile phone to be modified. The ESN is normally transmitted to the cellular company in order to ascertain whether the mobile phone user is the legitimate owner of that phone. Modifying the ESN as well as the phone number itself (known as the mobile identification number, or MIN), however, paves the way for fraudulent calls, as the target telephone is now a clone of the telephone from which the original ESN and MIN numbers were obtained.

Cloning has been shown to be successful on code division multiple access (CDMA) but rare on the Global System for Mobile communication (GSM), one of the more widely used mobile telephone communication systems. Cloning GSM phones, however, is achieved by cloning the SIM card contained within it, not necessarily any of the phone's internal data (GSM phones do not have ESN or MIN, only an IMEI number). There have been various methods used to obtain the ESN and MIN; the most common are to crack the cellular company, or eavesdrop on (sniff) the cellular network.

Unfortunately, phone cloning in its current state and practice is viewed negatively in the art. In fact, phone cloning is outlawed in the United Kingdom by the Wireless Telephone Protection Act of 1998, which prohibits knowingly using, producing, trafficking in, having control or custody of, or possessing hardware or software knowing that it has been configured to insert or modify telecommunication identifying information associated with or contained in a telecommunications instrument so that such instrument may be used to obtain telecommunications service without authorization. The effectiveness of phone cloning is limited. Every mobile phone contains a radio fingerprint in its transmission signal, which remains unique to that mobile phone despite changes to the device's ESN or MIN. Thus, cellular companies are often able to catch cloned phones when there are discrepancies between the fingerprint and the ESN or MIN.

The present inventors believe that there is a growing need for mobile phone users to clone their mobile communications devices. Mobile phones have become essential to everyday living for more than one billion users as of the date that this patent document was filed by the present inventors. Mobile phone users have all experienced times when their devices have been mistakenly left behind while traveling, ran out of battery charge or are otherwise unavailable because of work constraints. Under these circumstances, users may still have a need to monitor incoming calls, call logs, incoming data messages, contact lists, and may also want to return incoming communications from the phone number associated with their mobile device. There are no solutions in existence today that provide such services or that solve the problem where mobile phone users do not have access to their mobile phone for communications and data retrieval.

SUMMARY OF THE INVENTION

In light of shortcomings stated above with the current state of the art, the present inventors have determined that a need exists for systems and methods that can enable temporary, user-authorized cloning of mobile phone functionality on a secure server that can be accessed and controlled by the user through a remote client (e.g., via another user's mobile phone, a notebook computer, desktop computer, etc.).

The remote client can belong to an authorized user or it can belong to a third party that permits the authorized user to use the remote client to access and control the cloned mobile phone hosted on the secure server.

It is a feature of the present invention to provide a system wherein mobile phone users can elect to participate in a service that utilizes a secure server to clone the user's physical mobile phone functionality and communications activity, enables authorized users to set up secure cloning services on a secure server, and also enables authorized users to retrieve and control cloned features of their physical mobile phone via a remote client.

It is another feature of the present invention that an authorized user can communicate (receive and send communications) with third parties from the cloned phone identity using a remote client through the secure server wherein cloned mobile phone functionality and services are hosted for the user.

It is another feature of the present invention that all data communications and communications logs received or sent from the cloned mobile phone can be synchronized with the physical mobile phone associated with the clone mobile phone identity managed by the server.

It is yet another feature of the present invention that voice and text communication from the cloned phone can be transmitted to third parties with physical phone number identification information (e.g., the actual phone telephone number identification belonging to a user's physical phone that is cloned in the server).

It is a feature of the invention that cloned mobile phone server access via a remote client can require user authentication (e.g., a username and a secure identification number) in order to access and use the cloned phone identify over a remote client.

It is another feature of the present invention that termination of cloned mobile phone access (i.e., logging off from the secure server) from a remote client will prevent subsequent unauthorized access to the cloned phone identity from the remote client after termination of cloned mobile phone access to the server.

It is another feature of the present invention that secure servers hosting cloned mobile phones can be accessed via all wired and wireless data networks.

It is yet another feature of the present invention that a physical mobile phone can be remotely accessed and controlled from a remote client via a secure server connection, wherein the remote access via the secure server facilitates physical mobile phone cloning.

It is also a feature of the present invention that remote clients can include: PDAs, mobile phones, smartphones, tablet devices, laptop computers, desktop computers, and other network enabled devices that provide a user interface to support user access to secure servers of data networks and control of applications (e.g., phone cloning software and services) hosted by secure servers.

It is also a feature of the present invention that physical mobile phones that are cloned can include: smartphones, PDAs, mobile phones, and tablet devices with cell phone capabilities. Physical mobile phones can include Android™- or Apple™-based platforms and capabilities.

DETAILED DESCRIPTION

Mobile telephones (such as a smartphone in the form of an Android™-enabled cell phone supplied by various manufacturers or an iPhone™ supplied by Apple Corporation) have become a necessary, daily tool for more than one billion users throughout the world.

The specification of U.S. Pat. No. 7,630,721 (the '721 patent) issued to a co-inventor herein and entitled "Systems, methods and apparatuses for brokering data between wireless devices and data rendering devices" is herein incorporated by reference in its entirety for its teachings about mobile devices and supporting telecommunications equipment and networks description.

Figure 1:
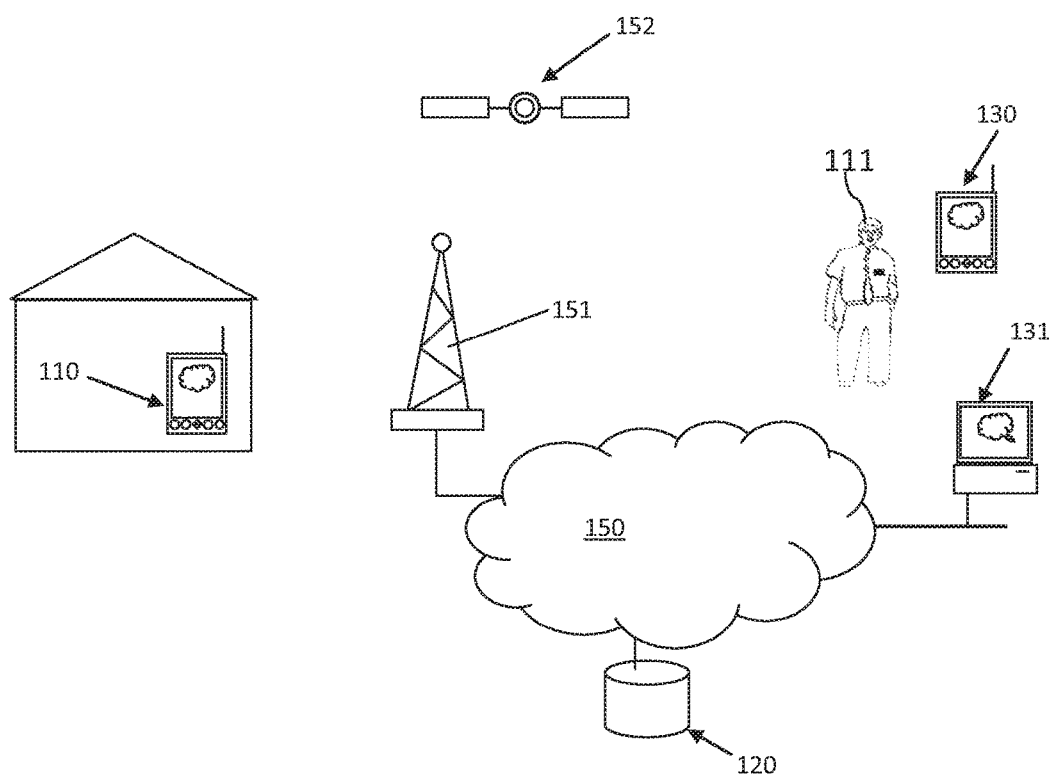
FIG. 1 illustrates a network diagram with system features of the present invention.

The present invention provides an authorized physical mobile phone user with an alternate means of virtual access to features and functionality of their physical mobile phone when the authorized user is without their physical mobile phone. Referring to FIG. 1, a block diagram of the system architecture that can support features of the present invention is illustrated. A physical mobile phone 110 is shown displaced from its authorized user 111 in FIG. 1. Features and functionality of the physical mobile phone 110, however, can be replicated via a secure server 120. Data in and/or associated with the physical mobile phone 110 can also be synchronized with the secure server 120. The physical mobile phone 110 and remote server 120 maintain communication using data and/or voice telecommunications equipment 151/152 over a data network 150. The authorized user 111 can securely access the secure server 120 over the data network 150 via a remote client 120/121. Secure access to the secure server 120 can be achieved where the authorized user 111 logs into the secure server 120 using the remote client 130/131. The user can log into the secure server 120 by entering a combination of a user identification and password onto a user interface (not shown) on the remote client 130/131. Once logged into the secure server 120, the authorized user 111 can access data, contacts, data logs (e.g., missed calls), voice messages, text messages, email through the remote client 130/131 as if the user were using her physical mobile phone 110. The authorized user 111 can also place voice calls and send text messages from the remote client 130/131 as if the user were using her physical mobile phone 110. A combination of the remote client 130/131 and secure server provides the user with communication via a virtual copy of the user's physical mobile phone, the virtual copy which can be referred to herein as a cloned mobile phone because of the functionality that is provided to users. It can be appreciated that the physical mobile phone 110 can also be accessed and controlled directly from a remote client 131/131 after authentication by secure server 120.

Systems and methods that can enable temporary, user-authorized cloning of mobile phone functionality on a secure server that can be accessed and controlled by the user through a remote client (e.g., via another parties mobile phone, a notebook computer, etc.). It should be appreciated that remote clients can include: PDAs, mobile phones, smartphones, tablet devices, laptop computers, desktop computers, and other network enabled devices that provide a user interface to support authorized user access to secure servers of data networks and control of applications (e.g., phone cloning software and services) hosted by secure servers.

Data network communications continues to improve and change. It is conceivable that the secure server functionality supporting phone cloning as taught herein can be hosted by a home location register (HLR) server and visiting location register (VLR) server, which are just some of the telecommunications equipment discussed in the '721 patent. It should also be appreciated given this teaching that secure server functionality supporting phone cloning as taught herein can be implemented in and hosted by internet-based servers in coordination with telecommunications network equipment. An example of such a server is an Android smartphone server and services that support data synchronization like that provided by Google Corporation. Another example where features of the present invention can be implemented are servers supporting Apple Corporation's MobileMe™ services, which can track iPhone™, iTouch™, iPad™ and Mac™ laptop locations and can also provide limited messaging and data wiping with the mobile device from a remote client. Neither one of the Google™ or Apple™ services, however, currently provide the phone cloning functionality being taught herein; although such services would be useful to both of these companies customers.

It can also be appreciated that a physical mobile phone can be accessed and controlled remotely by a remote client where the remote server facilitates the remote controlled session and therefore enables temporary physical mobile phone cloning so users can operate a physical mobile phone that has been left behind or is otherwise remote from its associated user. It is also a feature that a remote client can access a physical mobile phone directly; however, the present inventors believe that a secure server offers greater security to a user by requiring log in authentication, even before enabling direct physical mobile phone and remote client communications. This should not be confused with the popular LogMeIn application that enables remote access to home- or office-based computers. Desktop computers can be provided with ghost/remote access to another desktop using the LogMeIn™ Ignition software provided by LogMeIn, Inc., which enables users to access data from a handheld device such as a smartphone or Tablet. The Ignition application, however, is limited to data retrieval similar to what Google offers its users. LogMeIn does not allow a user to mirror or clone the communication features of a physical mobile device with a remote client, whether directly or through a secure server.

A mobile switching center (MSC) is the primary service delivery node for GSM/CDMA, responsible for routing voice calls and SMS as well as other services (such as conference calls, FAX and circuit switched data). The MSC sets up and releases the end-to-end connection, handles mobility and hand-over requirements during the call, and takes care of charging and real time pre-paid account monitoring. HLRs and VLRs are associated with MSCs and will store a subscriber's data. It should be appreciated that HLRs and VLRs can be configured with software to include cloned phone information and synchronize cloned phone activity with physical phones. HLRs and VLRs are logical "secure servers" as taught for use with cloned phone services herein because they already store other user information including logs and billing information.

The HLR is a central database that contains details of each mobile phone subscriber that is authorized to use the GSM core network. There can be several logical and physical, HLRs per public land mobile network (PLMN), though one international mobile subscriber identity (IMSI)/MSISDN pair can be associated with only one logical HLR (which can span several physical nodes) at a time. The HLRs can store details of every SIM card issued by the mobile phone operator. Each SIM has a unique identifier called an IMSI, which is the primary key to each HLR record. The next important item of data associated with the SIM is the MSISDN, which are the telephone numbers used by mobile phones to make and receive calls. The primary MSISDN is the number used for making and receiving voice calls and SMS, but it is possible for a SIM to have other secondary MSISDNs associated with it for fax and data calls. Each MSISDN is also a primary key to the HLR record. The HLR data is stored for as long as a subscriber remains with the mobile phone operator. Examples of other data stored in the HLR against an IMSI record is: GSM services that the subscriber has requested or been given, GPRS settings to allow the subscriber to access packet services, current location of subscriber (VLR and serving GPRS support node/SGSN), and call divert settings applicable for each associated MSISDN.

The HLR is also a system which directly receives and processes MAP transactions and messages from elements in the GSM network, for example, the location update messages received as mobile phones roam around. The HLR connects to the following elements: the G-MSC for handling incoming calls, the VLR for handling requests from mobile phones to attach to the network, the SMSC for handling incoming SMs, the voice mail system for delivering notifications to the mobile phone that a message is waiting, and the AUC for authentication and ciphering and exchange of data.

The main function of the HLR is to manage the fact that SIMs and phones move around a lot. The following procedures are implemented to deal with this: manage the mobility of subscribers by means of updating their position in administrative areas called 'location areas', which are identified with a LAC. The action of a user of moving from one LA to another is followed by the HLR with a Location area update procedure; send the subscriber data to a VLR or SGSN when a subscriber first roams there; broker between the G-MSC or SMSC and the subscriber's current VLR in order to allow incoming calls or text messages to be delivered; and remove subscriber data from the previous VLR when a subscriber has roamed away from it. It should now be appreciated that HLRs can be utilized to support user-authorized mobile phone cloning and functionality via various remote clients.

The authentication center (AUC) provides a function to authenticate each SIM card that attempts to connect to the GSM core network (typically when the phone is powered on). Once the authentication is successful, the HLR is allowed to manage the SIM and services described above. An encryption key is also generated that is subsequently used to encrypt all wireless communications (voice, SMS, etc.) between the mobile phone and the GSM core network. If the authentication fails, then no services are possible from that particular combination of SIM card and mobile phone operator attempted. There is an additional form of identification check performed on the serial number of the mobile phone described in the EIR section below, but this is not relevant to the AUC processing. Proper implementation of security in and around the AUC is a key part of an operator's strategy to avoid unauthorized SIM cloning. It should be appreciated that the AUC can be utilized to support user-authorized mobile phone cloning and functionality from a remote client.

The AUC does not engage directly in the authentication process, but instead generates data known as triplets for the MSC to use during the procedure. The security of the process depends upon a shared secret between the AUC and the SIM called the Ki. The Ki is securely burned into the SIM during manufacture and is also securely replicated onto the AUC. This Ki is never transmitted between the AUC and SIM, but is combined with the IMSI to produce a challenge/response for identification purposes and an encryption key called Kc for use in over the air communications. After successful authentication, the MSC sends the encryption key Kc to the base station controller (BSC) so that all communications can be encrypted and decrypted.

The visitor location register is a database of the subscribers who have roamed into the jurisdiction of the MSC, which it serves. Each base station in the network is served by exactly one VLR hence, a subscriber cannot be present in more than one VLR at a time. The data stored in the VLR has either been received from the HLR, or collected from the MS (Mobile station). In practice, for performance reasons, most vendors integrate the VLR directly to the V-MSC and, where this is not done, the VLR is very tightly linked with the MSC via a proprietary interface. Whenever a MSC detects a new MS in its network, in addition to creating a new record in the VLR, it also updates the HLR of the mobile subscriber, informing it of the new location of that MS. If VLR data is corrupted, it can lead to serious issues with text messaging and call services. Data stored in a VLR include: IMSI (the subscriber's identity number), authentication data, MSISDN (the subscriber's phone number), GSM services that the subscriber is allowed to access, access point (GPRS) subscribed, and the HLR address of the subscriber. The primary functions of the VLR are: to inform the HLR that a subscriber has arrived in the particular area covered by the VLR, to track where the subscriber is within the VLR area (location area) when no call is ongoing, to allow or disallow which services the subscriber may use, to allocate roaming numbers during the processing of incoming calls, and to purge the subscriber record if a subscriber becomes inactive whilst in the area of a VLR. The VLR deletes the subscriber's data after a fixed time period of inactivity and informs the HLR (e.g., when the phone has been switched off and left off or when the subscriber has moved to an area with no coverage for a long time), and to delete the subscriber record when a subscriber explicitly moves to another, as instructed by the HLR. It should be appreciated that VLRs can be utilized to support user-authorized mobile phone cloning and functionality from various remote clients.

The equipment identity register (EIR) is often integrated to the HLR. The EIR keeps a list of mobile phones (identified by their IMEI), which are to be banned from the network or monitored. This is designed to allow tracking of stolen mobile phones. In theory all data about all stolen mobile phones should be distributed to all EIRs in the world through a Central EIR. It is clear, however, that there are some countries where this is not in operation. The EIR data does not have to change in real time, which means that this function can be less distributed than the function of the HLR. The EIR is a database that contains information about the identity of the mobile equipment that prevents calls from stolen, unauthorized or defective mobile stations. It should be appreciated that the EIR can operate together with the HLR to enable authorized cloning and support functionality of physical mobile phones. It should be appreciated that an EIR can be used to support user-authorized mobile phone cloning and functionality via a remote client.

Other telecommunication network equipment modules that the skilled should now appreciate can enhance features of the present invention includes the following: a billing center that is normally responsible for processing the toll tickets generated by the VLRs and HLRs and generating a bill for each subscriber. It is also responsible for generating billing data of roaming subscriber, a short message service center (SMSC), which supports the sending and reception of text messages, a multimedia messaging service center (MMSC), which supports the sending of multimedia messages (e.g., images, audio, video and their combinations) to (or from) MMS-enabled Handsets, and a voicemail system (VMS), which records and stores voicemails.

Figure 2:
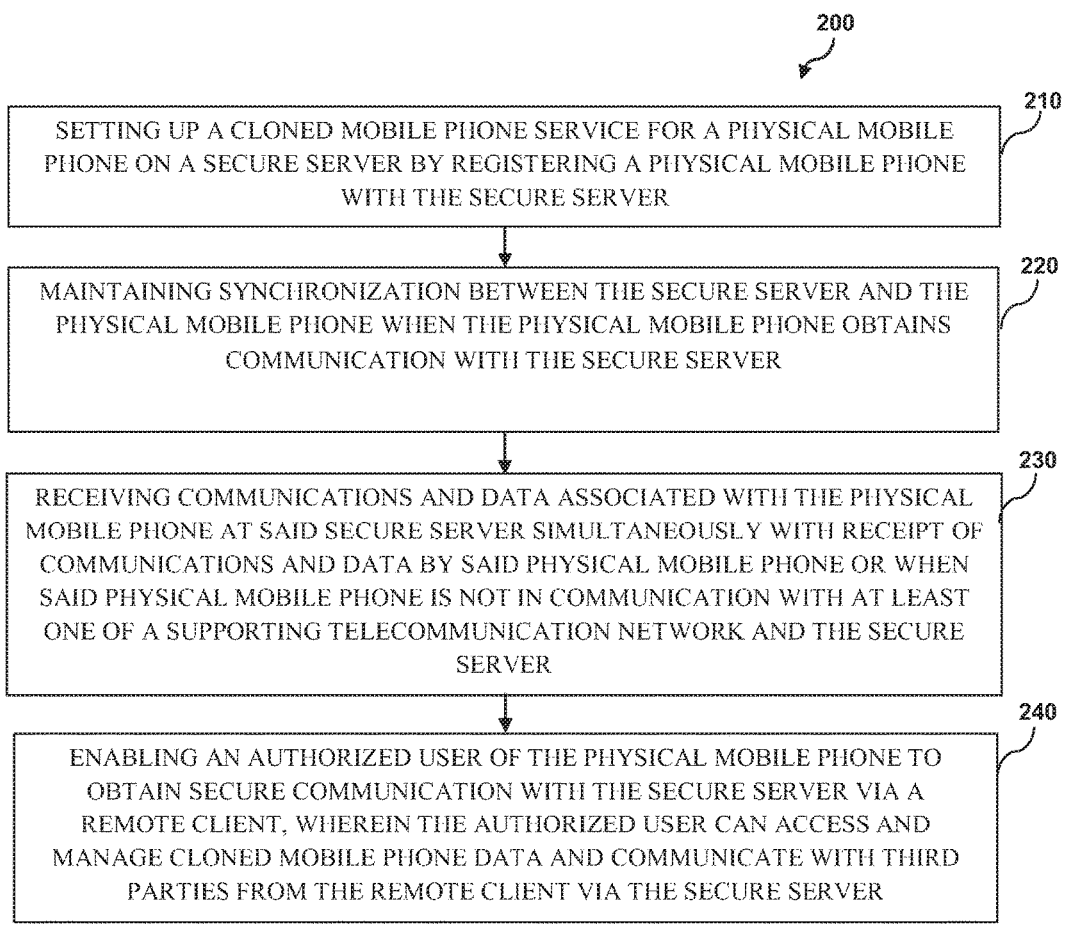
FIGS. 2-3 are flow diagrams of a process for carrying out features of the present invention.

Referring to FIG. 2, a flow diagram of steps for carrying out features of the present invention is illustrated. The method can enable temporary, user-authorized cloning of physical mobile phone functionality on a secure server that can be accessed and controlled by the user through a remote client. As shown in block 210, the first step is setting up a cloned mobile phone service for a physical mobile phone on a secure server by registering a physical mobile phone with the secure server. Next, as shown in step 220, the second step is maintaining synchronization between the secure server and the physical mobile phone when the physical mobile phone obtains communication with the secure server. The third step is receiving communications and data associated with the physical mobile phone at said secure server simultaneously with receipt of communications and data by said physical mobile phone or when said physical mobile phone is not in communication with at least one of a supporting telecommunication network and the secure server, as shown in block 230. Then, the last step in the diagram is enabling an authorized user of the physical mobile phone to obtain secure communication with the secure server via a remote client, wherein the authorized user can access and manage cloned mobile phone data and communicate with third parties from the remote client via the secure server, as shown is step 240.

Figure 3:
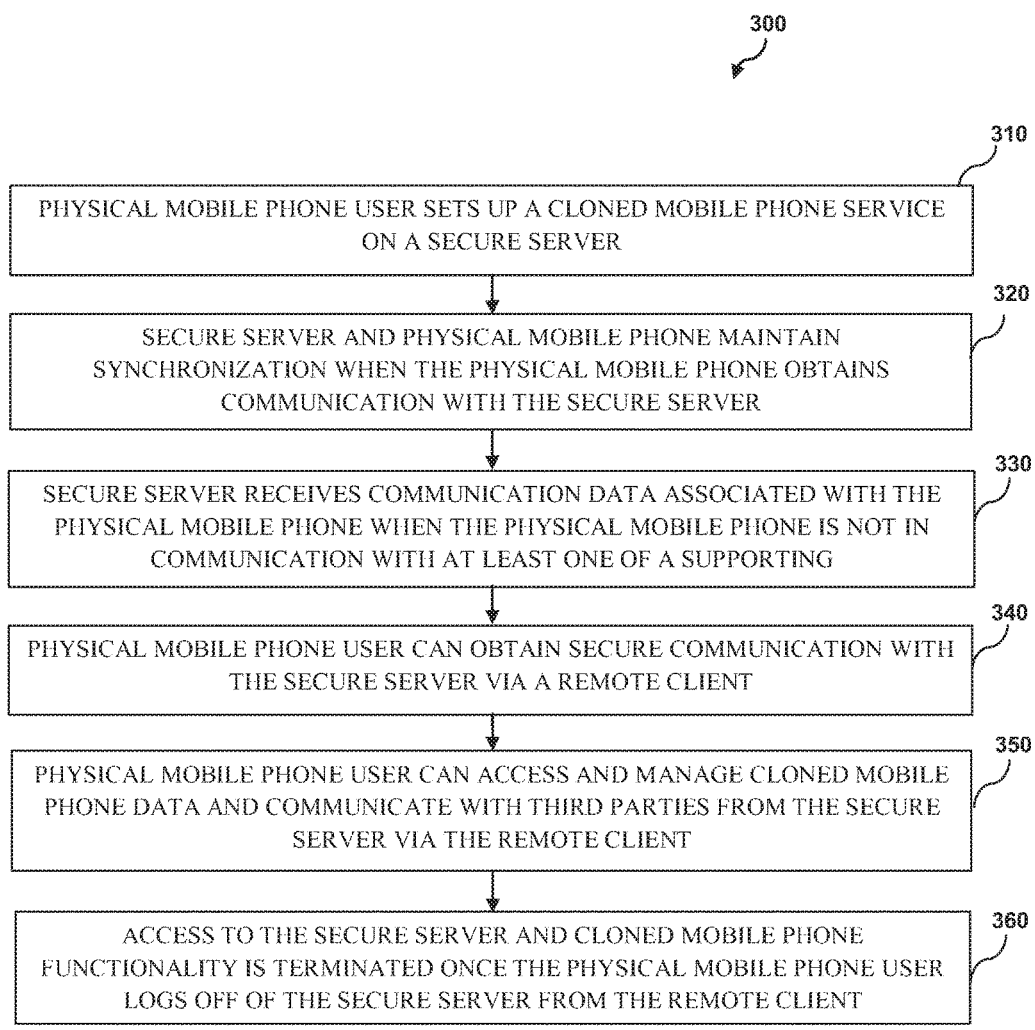

Referring to FIG. 3, a flow diagram of alternative steps for carrying out features of the present invention is illustrated. A physical mobile phone user sets up a cloned mobile phone service on a secure server, as shown in step 310. The physical mobile phone user can set up the service by registering physical mobile phone data and includes a username and password. The secure server and physical mobile phone maintain synchronization when the physical mobile phone obtains communication with the secure server, as shown in step 320. The secure server receives communication data associated with the physical mobile phone when the physical mobile phone is not in communication with at least one of a supporting telecommunication network and the secure server, as shown in step 330. The physical mobile phone user can obtain secure communication with the secure server via a remote client, as shown in step 340. The physical mobile phone user can access and manage cloned mobile phone data and communicate with third parties from the secure server via the remote client, as shown in step 350. Access to the secure server and cloned mobile phone functionality is terminated once the physical mobile phone user logs off of the secure server from the remote client, as shown in step 360.

The invention claimed is:

1. A method enabling temporary, user-authorized cloning of an authorized user's physical mobile phone functionality and data via another remote client based on data stored in a secure server that can be accessed and controlled by the authorized user through another remote client to obtain and manage data and communicate with third parties as if communication were from the physical mobile phone, comprising:

setting up a cloned mobile phone service for a physical mobile phone on a secure server by registering a physical mobile phone associated with the authorized user with the secure server;

maintaining synchronization of features, functionality and data between the secure server and the physical mobile phone when the physical mobile phone is in communication with the secure server and maintaining functionality with respect to incoming communications from third parties when the physical mobile phone is out of communication with the secure server;

receiving and recording a communications and data file of communications and data associated with the physical mobile phone at said secure server simultaneously with receipt of communications and data by said physical mobile phone or when said physical mobile phone is not in communication with at least one of a supporting telecommunication network and the secure server; and enabling the authorized user of the physical mobile phone to obtain secure communication with the secure server and access the communications and data file via the another remote client capable of supporting voice and text data communications, wherein the authorized user can access and manage cloned mobile phone data representing the physical mobile phone from the communications and data file including voice and text communications and the authorized user can engage in communication with third parties via coordination between the another remote client and the secure server using physical mobile phone identification information in place of the another remote client identification information, wherein access to the secure server and cloned mobile phone functionality and the data file using the another remote client is terminated with data related to communications and processed with the another remote client on behalf of the authorized user is recorded in the communications and data file once the another remote client terminates communication with the remote server.

2. The method of claim 1, wherein said physical mobile phone includes at least one of: a smartphones, a PDA, a mobile phone, and a tablet device with cell phone capabilities.

3. The method of claim 1, wherein said remote client includes at least one of: another user mobile phone, a notebook computer, and a desktop computer.

4. The method of claim 1, wherein voice and text communication from the secure server can be transmitted to third party mobile phones with phone number identification information for said physical mobile phone.

5. The method of claim 1, wherein said secure server includes at least one of: a HLR, a VLR, a MSC, and a internet-based server.

6. A method enabling temporary, user-authorized cloning of an authorized user's portable communications device's functionality and associated data using another remote client based on data stored on a secure server that can be accessed and controlled by the authorized user through the another remote client to obtain and manage the data and communicate with third parties, comprising:
providing a secure server configured for continuously cloning mobile device functionality and data, wherein the authorized user sets up a cloned mobile phone service on the secure server by registering the portable communications device with the secure server;
the secure server and the portable communications device maintain synchronization of functionality and data with the secure server when the portable communications device is in communication with the secure server;
the secure server receives updates from the portable communications device and records a communication and data file of communication data including logs of voice calls and text data associated with the user's smartphone when the portable communications device is not available to the authorized user or is otherwise not in communication with at least one of a supporting telecommunication network and the secure server;
the user's smartphone becomes unavailable to the user;
the user selectively and securely accesses the remote server and the communication and data file via the another remote client capable of supporting voice and text data communications and manages cloned mobile phone functionality and data representing the portable communications device, accesses voice and text communications associated with the portable communications device, and selectively communicates in voice and text with third parties from the another remote client via the secure server using the portable communications device's identification information during voice and text communication with third party devices as if the another remote client is the portable communications device associated with the authorized user while communicating in voice and text with third party devices from the another remote client via the secure server using the identification information for the portable communications device that normally represents the identity of the portable communications device and the authorized user for identification to the third party devices; and
termination of authorized access to the secure server and cloned mobile phone functionality with the another remote client and data representing any voice logs and text communications during the authorized access is stored in the communications and data file at the secure server once communication with the secure server is terminated from the another remote client.

7. The method of claim 6, wherein the authorized user can set up the service by registering the portable communications device data and including a username and password.

8. The method of claim 6, wherein said another remote client includes at least one of: another user mobile phone, a notebook computer, and a desktop computer.

9. The method of claim 6, wherein voice and text communication from the secure server can be transmitted to third party mobile phones with the identification information for the portable communications device that includes using caller identification information in the form of the portable communications device's phone number used during voice and text communication with third party devices directly from the portable communications device as if the another remote client is the portable communications device associated with the authorized user when communicating in voice and text with third party devices from the another remote client via the secure server.

10. The method of claim 6, wherein said secure server includes at least one of: a HLR, a VLR, a MSC, and a internet-based server.

11. A system enabling temporary, user-authorized cloning of an authorized user's portable communications device's data and communications functionality on a secure server that can be accessed and controlled by the authorized user via another remote client, comprising a secure server with data network access, said secure server configured to clone authorized user portable communications device data and their functionality including storage of portable communications device registration information, enabling secure access by the authorized users of portable communications devices registered with the secure server via other remote clients, maintaining communication and synchronization of the functionality and the data associated with the portable communications devices in a communications and data file associated with authorized users and their portable communications devices, receiving communication data associated with the portable communications devices when the portable communications devices are not available to their authorized users or are not in communication with at least one of a supporting telecommunication network and the secure server, and enabling authorized users of the portable communications devices registered with the secure server to obtain secure communication with the secure server via other remote clients, access and manage cloned mobile phone data stored in the communications and data file, and communicate with third parties wherein authorized user access to the secure server and cloned portable communications device functionality with the remote client is terminated by the secure server once communications terminates between the secure server and the remote clients.

12. The system of claim 11, wherein the authorized user can set up the service by registering portable communications device data and including a username and password.

13. The system of claim 11, including the step wherein access to the secure server and cloned portable communications device functionality with the remote client is terminated by the secure server once at least on of the authorized user logs off of the secure server from the remote client or the remote client losses communication with the remote server.

14. The system of claim 11, wherein said portable communications device includes at least one of: a smartphones, a PDA, a mobile phone, and a tablet device with cell phone capabilities.

15. The system of claim 11, wherein said remote client includes at least one of: another user's mobile phone, a notebook computer, and a desktop computer.

16. The system of claim 11, wherein voice and text communication from the secure server can be transmitted to third party mobile phones with phone number identification information for said portable communications device.

17. The system of claim 11, wherein said secure server includes at least one of: a HLR, a VLR, a MSC, and an internet-based server.

\* \* \* \* \*